United States Patent
Fischer et al.

[11] Patent Number: 6,103,821
[45] Date of Patent: Aug. 15, 2000

[54] CROSSLINKING AGENTS FOR EMULSION POLYMERS

[75] Inventors: Michael Fischer, Ludwigshafen; Gerhard Lindenschmidt, Leimen; Graham Edmund Mc Kee; Bernhard Rosenau, both of Neustadt; Herbert Naarmann, Frankenthal, all of Germany

[73] Assignee: BASF Aktiengesellschaft, Ludwigshafen, Germany

[21] Appl. No.: 09/230,743

[22] PCT Filed: Jul. 29, 1997

[86] PCT No.: PCT/EP97/04127

§ 371 Date: Feb. 1, 1999

§ 102(e) Date: Feb. 1, 1999

[87] PCT Pub. No.: WO98/05695

PCT Pub. Date: Feb. 12, 1998

[30] Foreign Application Priority Data

Aug. 1, 1996 [DE] Germany ............... 196 31 148

[51] Int. Cl.⁷ ........................................ C08F 2/16
[52] U.S. Cl. ............ 524/804; 524/819; 524/832; 525/67; 525/69; 525/242; 525/243
[58] Field of Search ............................. 525/242, 243, 525/67, 69; 524/804, 819, 832

[56] References Cited

U.S. PATENT DOCUMENTS

| | | |
|---|---|---|
| 3,691,260 | 9/1972 | Mittnacht . |
| 3,895,082 | 7/1975 | Hochberg . |
| 3,929,693 | 12/1975 | Hochberg . |
| 4,224,419 | 9/1980 | Swoboda . |
| 4,788,253 | 11/1988 | Hambrecht . |
| 5,373,035 | 12/1994 | Wang et al. . |

FOREIGN PATENT DOCUMENTS

| | | |
|---|---|---|
| 321 403 | 6/1989 | European Pat. Off. . |
| 1 260 135 | 2/1968 | Germany . |
| 28 26 925 | 1/1980 | Germany . |
| 32 27 555 | 1/1984 | Germany . |
| 1124911 | 8/1968 | United Kingdom . |
| 1 340 026 | 12/1973 | United Kingdom . |

*Primary Examiner*—Jeffrey Mullis
*Attorney, Agent, or Firm*—Keil & Weinkauf

[57] ABSTRACT

Compounds of the general formula (I):

$$H(-CH_2-CR^1R^2)_m(-CH_2-CR^1R^3)_n-H \quad (I)$$

where $R^1$ is H or methyl, $R^2$ is $-C(O)-Y-R^4$, where $R^4$ is H, methyl, ethyl or allyl, $R^3$ is $-C(O)-Y-$allyl and Y is O or NH, or $R^1$ is H or $C_1-C_{20}$-alkyl, $R^2$ is H and $R^3$ is $(-CH_2-CR^5=CR^6-CH_2)_p-H$, where $R^5$ and $R^6$ independently are each H, methyl, ethyl or chlorine and p is 1–100, or $R^1$ is H, $R^2$ is OH or O-allyl and $R^3$ is O-allyl, or $R^1$ is H, $R^2$ is OH or $R^3$ and $R^3$ is (meth)acrylate, $-O-C(O)-CH=CH-COOH$ or $-O-C(O)-CH_2-C(=CH_2)-COOH$, and m is an integer from 5 to 500,000 and n is an integer from 2 to 100,000, are used as crosslinking agents in particulate emulsion polymers having a glass transition temperature below 0° C. and a mean particle size of from 50 to 1000 nm.

11 Claims, No Drawings

CROSSLINKING AGENTS FOR EMULSION POLYMERS

The present invention relates to crosslinking agents for emulsion polymers. In particular, the present invention relates to the use of certain crosslinking agents in particulate emulsion polymers, preferably graft copolymers, and molding materials containing them and moldings thereof.

Thermoplastic molding materials which consist of a graft copolymer in a polymer matrix are used for the production of a large number of moldings.

DE-A-1 260 135 discloses thermoplastic molding materials which consist of a copolymer matrix and a graft copolymer. The graft copolymer contains a core of a copolymer of an acrylate of an alcohol of 4–8 carbon atoms and of an acrylate of tricyclodecenyl alcohol. The shell consists of a copolymer from styrene and acrylonitrile. The copolymer matrix consists of styrene and acrylonitrile as monomer units.

DE-A-1 911 882 discloses similar molding materials of a graft copolymer comprising an acrylate core and a styrene/acrylonitrile shell, embedded in a copolymer matrix of styrene and acrylonitrile. The graft copolymers have mean particle diameters of from 150 to 800 nm.

DE-A-2 826 925 discloses thermoplastic molding materials which consist of a graft copolymer of a crosslinked acrylate polymer having a mean particle diameter of about 50–150 nm and a graft shell of styrene and acrylonitrile and a further graft copolymer of a crosslinked acrylate polymer having a mean particle diameter of from about 200 to 500 nm and styrene and acrylonitrile as the graft shell, the two graft copolymers being introduced into an acrylonitrile/styrene copolymer.

DE-A-3 227 555 describes thermoplastic molding materials which contain graft copolymers. The grafting bases consist of crosslinked polyacrylates and the graft shell is synthesized in two stages, from 20 to 70% by weight of a vinylaromatic monomer, in particular styrene, being applied in a first stage and from 30 to 80% by weight of a mixture of a vinylaromatic and of an ethylenically unsaturated monomer, in particular of styrene and of acrylonitrile in a weight ratio of from 90:10 to 60:40, being applied in a second stage. The graft copolymers are present in a copolymer of styrene and acrylonitrile.

These molding materials are resistant to weathering and are impact-resistant. However, the impact strength has to be improved for some applications.

It is an object of the present invention to provide thermoplastic molding materials which contain a particulate emulsion polymer in an amorphous or semicrystalline polymer and have an impact strength which is improved in comparison with the known molding materials.

We have found that this object is achieved, according to the invention, by the use of compounds of the general formula (I)

where
  $R^1$ is H or methyl,
  $R^2$ is —C(O)—Y—$R^4$, where $R^4$ is H, methyl, ethyl or allyl,
  $R^3$ is —C(O)—Y-allyl and
  Y is O or NH,
or
  $R^1$ is H or $C_1$–$C_{20}$-alkyl,
  $R^2$ is H and
  $R^3$ is (—$CH_2$—$CR^5$=$CR^6$—$CH_2$)$_p$—H,
  where $R^5$ and $R^6$ independently are each H, methyl, ethyl or chlorine and p is 1–100,
or
  $R^1$ is H,
  $R^2$ is OH or O-allyl and
  $R^3$ is O-allyl,
or
  $R^1$ is H,
  $R^2$ is OH or $R^3$ and
  $R^3$ is (meth)acrylate, —O—C(O)—CH=CH—COOH or —O—C(O)—$CH_2$—C(=$CH_2$)—COOH, and m is an integer from 5 to 500,000 and n is an integer from 2 to 100,000, as crosslinking agents in particulate emulsion polymers having a glass transition temperature below 0° C. and a mean particle size of from 50 to 1000 nm.

The present invention therefore also relates to thermoplastic molding materials containing, based on the sum of the amounts of components A and B and, if required, C and/or D, which altogether gives 100% by weight, a: from 1 to 99, preferably from 15 to 60, in particular from 25 to 50, % by weight of a particulate emulsion polymer having a glass transition temperature below 0° C. and a mean particle size of from 50 to 1000 nm, which contains from 0.5 to 30% by weight, based on the amount of component A, of at least one crosslinking agent as of the formula I as component A, b: from 1 to 99, preferably from 40 to 85, in particular from 50 to 75, % by weight of at least one amorphous or semicrystalline polymer as component B, c: from 0 to 50% by weight of polycarbonates as component C, and d: from 0 to 50% by weight of fibrous or particulate fillers or mixtures thereof as component D.

CROSSLINKING AGENTS

We have found, according to the invention, that, by using certain crosslinking agents, it is possible to obtain thermoplastic molding materials which have improved impact strength in comparison with known molding materials.

Compounds of the general formula (I):

where
  $R^1$ is H or methyl,
  $R^2$ is —C(O)—Y—$R^4$, where $R^4$ is H, methyl, ethyl or allyl,
  $R^3$ is —C(O)—Y-allyl and
  Y is O or NH,
or
  $R^1$ is H or $C_1$–$C_{20}$-alkyl,
  $R^2$ is H and
  $R^3$ is (—$CH_2$—$CR^5$=$CR^6$—$CH_2$)$_p$-H,
  where $R^5$ and $R^6$ independently are each H, methyl, ethyl or chlorine and p is 1–100,
or
  $R^1$ is H,
  $R^2$ is OH or O-allyl and
  $R^3$ is O-allyl,
or
  $R^1$ is H, $R^2$ is OH or $R^3$ and $R^3$ is (meth)acrylate, —O—C(O)—CH=CH—COOH or —O—C(O)—CH$_2$—C(=CH$_2$)—COOH, and m is an integer from 5 to 500,000 and n is an integer from 2 to 100,000, are used.

Crosslinking agents of the general formula (I) in which m is an integer from 500 to 50,000 and the ratio n:m is from 1:50 to 10:1, preferably from 1:20 to 1:1, in particular from 1:10 to 1:5, are preferably used.

According to one embodiment of the invention, $R^1$ is H or methyl, $R^2$ is —C(O)—Y—$R^4$, where $R^4$ is H, methyl, ethyl or allyl, and $R^3$ is —C(O)—Y-allyl and Y is O or NH.

Y is preferably O, so that the compounds are poly(meth) acrylates in which at least some of the acrylic acid functions have been esterified with allyl alcohol. The remaining (meth)acrylic acid groups may be present as free acid groups or, preferably, as methyl ester or ethyl ester, in particular as methyl ester. In other words, this is therefore a polymethyl (meth)acrylate or polyethyl (meth)acrylate which is at least partially transesterified with allyl alcohol. Preferably from 2 to 80, particularly preferably from 5 to 50, in particular from 10 to 15, % by weight, based on polymethyl (meth)acrylate or polyethyl (meth)acrylate have been transesterified with allyl alcohol.

The number average molecular weight of the compounds is preferably from 10,000 to 500,000, particularly preferably from 50,000 to 400,000, in particular from 250,000 to 300,000.

The novel compounds, which may be referred to as polyallyl (meth)acrylates or polyallyl (meth)acrylamides, are prepared by known esterification reactions of poly(meth) acrylic acid or by transesterification reactions with allyl alcohol or by reaction of poly(meth)acrylic anhydride with allyl alcohol. The use of allylamine gives the corresponding acrylamides on reaction with the esters or anhydrides.

According to one embodiment of the invention, $R^1$ is H or $C_1$–$C_{20}$-alkyl, $R^2$ is H and $R^3$ is (—CH$_2$—CR$^5$=CR$^6$—CH$_2$)$_p$-H, where $R^5$ and $R^6$ independently are each H, methyl, ethyl or chlorine and p is 1–100, in the compound of the general formula (I).

$R^1$ is preferably H or $C_1$–$C_6$-alkyl, in particular H or CH$_3$, C$_2$H$_5$, C$_3$H$_7$ or C$_4$H$_9$.

p is preferably from 1 to 50, particularly preferably from 1 to 10. One of the radicals $R^5$ and $R^6$ is preferably H and the other radical is H, methyl or chlorine.

The compounds are preferably ethylenes grafted with butadiene or isoprene. The polyethylene skeleton may be free of branches or may have a degree of branching of from 10 to 500, preferably from 20 to 100, per 1000 carbon atoms.

The amount of gafted-on butadiene or isoprene is preferably from 5 to 80, particularly preferably from 20 to 70, in particular from 40 to 60, % by weight, based on the polyethylene skeleton, which may be branched. The number average molecular weight of the grafted compounds is preferably from 10,000 to 2,000,000, particularly preferably from 100,000 to 1,000,000, in particular from 400,000 to 800,000.

The novel compounds, which may also be referred to as dienyl-polyethylenes, are preferably prepared from polyethylenes preferably metalated with lithium, said polyethylenes then being grafted with dienes, preferably w with butadiene and/or isoprene.

According to one embodiment of the invention, $R^1$ is H, $R^2$ is OH or O-allyl and $R^3$ is O-allyl in the compounds of the general formula (I).

These are therefore polyvinyl alcohols which are at least partially etherified with allyl groups. The degree of etherification is preferably from 1 to 80, particularly preferably from 5 to 100, in particular from 5 to 10, % by weight, based on the parent polyvinyl alcohol.

The compound preferably has a number average molecular weight of from 10,000 to 2,000,000, particularly preferably from 50,000 to 1,000,000, in particular from 400,000 to 800,000.

The novel compounds may be prepared by known etherification processes, for example with allyl halides, such as allyl chloride or allyl bromide, and polyvinyl alcohol. In addition to polyvinyl alcohol, polyols, sugars or polysaccharides may generally be used as a basis for etherification.

According to one embodiment of the invention, $R^1$ is H, $R^2$ is OH or $R^3$ and $R^3$ is (meth)acrylate, —O—C(O)—CH=CH—COOH or —O—C(O)—CH$_2$C(=CH$_2$)—COOH in the compounds of the general formula (I).

These compounds may be regarded as polyvinyl alcohols which are at least partially esterified with acrylic acid or methacrylic acid, maleic acid etc.

Preferably, $R^2$ is OH and $R^3$ is (meth)acrylate.

The number average molecular weight of the compound is preferably from 10,000 to 1,000,000, particularly preferably from 50,000 to 200,000, in particular from 10 100,000 to 150,000.

The amount of acrylate or methacrylate is preferably from 5 to 80, particularly preferably from 10 to 50, in particular from 10 to 20, % by weight, based on the polyvinyl alcohol skeleton.

The compounds can be prepared by reacting the corresponding acid chlorides or anhydrides or acids with polyvinyl alcohol or other suitable polyols.

The novel crosslinking agents are preferably present in particulate emulsion polymers having a glass transition temperature below 0° C. and a mean particle size of from 50 to 1000 nm. They are preferably used in amounts of from 0.5 to 30, particularly preferably from 0.5 to 20, in particular from 0.5 to 5, % by weight, based on the particulate emulsion polymer.

The emulsion polymer is preferably a graft copolymer comprising a particulate grafting base A1 having a glass transition temperature below 0° C. and a graft layer A2 comprising vinylaromatic and/or ethylenically unsaturated monomers. The novel crosslinking agents may be present in the grafting base, in the graft layer or both in the grafting base and in the graft layer. They are preferably present in the grafting base, preferably in an amount of from 1 to 30, particularly preferably from 1 to 20, in particular from 1 to 5, % by weight, based on the amount of the grafting base comprising A1. The novel crosslinking agents are particularly advantageously used in the molding materials described below.

MOLDING MATERIALS

The novel crosslinking agents are used in thermoplastic molding materials containing, based on the sum of the amounts of components A and B and, if required, C and/or D, which altogether gives 100% by weight, a: from 1 to 99, preferably from 15 to 60, in particular from 25 to 50, % by weight of a particulate emulsion polymer having a glass transition temperature below 0° C. and a mean particle size of from 50 to 1000 nm, which contains from 0.5 to 30% by weight, based on the amounts of component A, of at least one crosslinking agent as described above as component A, b: from 1 to 99, preferably from 40 to 85, in particular from 50 to 75, % by weight of at least one amorphous or semicrystalline polymer as component B, c: from 0 to 50% by weight of polycarbonates as component C, and d: from 0 to 50% by weight of fibrous or particulate fillers or mixtures thereof as component D.

The components A to D are described below.

Component A

Component A is a particulate emulsion polymer having a glass transition temperature below 0° C. and a mean particle size of from 50 to 1000 nm.

According to one embodiment of the invention, the mean particle size of component A is from 50 to 800 nm, preferably from 50 to 600 nm.

According to a further novel embodiment, the particle size distribution of component A is bimodal, from 60 to 90% by weight having a mean particle size of from 50 to 200 nm and from 10 to 40% by weight having a mean particle size of from 50 to 400 nm, based on the total weight of component A.

The quantities determined from the integral mass distribution are stated as mean particle size or particle size distribution. The mean particle sizes according to the invention are in all cases the weight average of the particle sizes as determined by means of an analytical ultracentrifuge according to the method of W. Scholtan and H. Lange, Kolloid-Z. und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size. The mean particle diameter, which is also referred to as the $d_{50}$ value of the integral mass distribution, is defined as the particle diameter at which 50% by weight of the particles have a smaller diameter than the diameter which corresponds to the $d_{50}$ value. Likewise, 50% by weight of the particles then have a larger diameter than the $d_{50}$ value. In addition to the $d_{50}$ value (mean particle diameter), the $d_{10}$ and $d_{90}$ values resulting from the integral mass distribution are used for characterizing the width of the particle size distribution of the rubber particles. The $d_{10}$ and $d_{90}$ values of the integral mass distribution are defined similarly to the $d_{50}$ value, except that they are based on 10 and 90% by weight, respectively, of the particles.

The quotient:

$$\frac{d_{90} - d_{10}}{d_{50}} = Q$$

is a measure of the width of the particle size distribution. Emulsion polymers A which may be used according to the invention as component A preferably have Q values of less than 0.5, in particular less than 0.35.

The glass transition temperature of the emulsion polymer A as well as of the other components used according to the invention is determined by means of DSC (differential scanning calorimetry) according to ASTM 3418 (mid point temperature).

The emulsion polymer A used may be relevant conventional rubbers which can be crosslinked with the novel crosslinking agents, such as, according to one embodiment of the invention, epichlorohydrin rubbers, ethylene/vinyl acetate rubbers, chlorosulfonated polyethylene rubbers, silicone rubbers, polyether rubbers, hydrogenated diene rubbers, polyalkenamer rubbers, acrylate rubbers, ethylene/propylene rubbers, ethylene/propylene/diene rubbers, butyl rubbers and fluorine rubbers. Acrylate rubber, ethylene/propylene (EP) rubber and ethylene/propylene/diene (EPDM) rubber are preferably used, in particular acrylate rubber.

According to one embodiment, the amount of the basic diene building block in the emulsion polymer A is kept so small that very few unreacted double bonds remain in the polymer. According to one embodiment, no basic diene building blocks are present in the emulsion polymer A.

The acrylate rubbers are preferably alkyl acrylate rubbers obtained from one or more $C_{1-C8}$-alkyl acrylates, preferably $C_{4-C8}$-alkyl acrylates, preferably at least some butyl, hexyl, octyl or 2-ethylhexyl acrylate, in particular n-butyl and 2-ethylhexyl acrylate, being used. In addition to the alkyl acrylate rubbers, up to 49, preferably up to 10, % by weight, based on component A, of the following components A21 and A22 or maleic anhydride, in particular monomers forming hard polymers, such as vinyl acetate, (meth)acrylonitrile, styrene, substituted styrene, methyl methacrylate and vinyl ether, may be polymerized in component A.

Component A contains from 0.5 to 30, preferably from 0.5 to 20, in particular from 0.5 to 5, % by weight, based on the total component A, of at least one crosslinking agent as described above.

According to one embodiment of the invention, the acrylate rubbers may furthermore contain from 0 to 10, preferably from 0.1 to 5, % by weight of further crosslinking, polyfunctional monomers (crosslinking monomers). Examples of these are monomers which contain 2 or more double bonds which are capable of copolymerization and are preferably not conjugated in the 1,3 positions.

Examples of suitable further crosslinking monomers are divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate and allyl methacrylate. Dicyclopentadienyl acrylate (DCPA) has proven a particularly advantageous crosslinking monomer (cf. German Patent 1,260,135).

Suitable silicone rubbers may be, for example, crosslinked silicone rubbers comprising units of the general formulae $R_2SiO$, $RSiO_{3/2}$, $R_3SiO_{1/2}$ and $SiO_{2/4}$, where R is a monovalent radical. The amount of the individual siloxane units is such that from 0 to 10 molar units of the formula $RSiO_{3/2}$, from 0 to 1.5 molar units of $R_3SiO_{1/2}$ and from 0 to 3 molar units of $SiO_{2/4}$ are present per 100 units of the formula $R_2SiO$. R may be either a monovalent saturated hydrocarbon radical of 1 to 18 carbon atoms, the phenyl radical or the alkoxy radical or a group, such as the vinyl or the mercaptopropyl radical, which can readily be attacked by free radicals. It is preferable if at least 80% of all radicals R are methyl radicals; combinations of methyl and ethyl or phenyl radicals are particularly preferred.

Preferred silicone rubbers contain incorporated units of groups, in particular vinyl, allyl, halogen or mercapto groups, which can be attacked by free radicals, preferably in amounts of 2–10 mol %, based on all radicals R. They can be prepared, for example, as described in EP-A 260 558.

Core/shell Emulsion Polymer A

The emulsion polymer A may also be a multistage polymer (ie. may have a coreshell morphology). For example, an elastomeric core ($T_g<0°$ C.) may be surrounded by a hard shell (polymers having $T_g>0°$ C.), or vice versa.

In a particularly preferred embodiment of the invention, the component A is a graft copolymer. The graft copolymers A of the novel molding materials have a mean particle size $d_{50}$ of from 50 to 1000 nm, preferably from 50 to 600 nm, particularly preferably from 50 to 400 nm. These particle sizes can be achieved if particle sizes of from 50 to 350 nm, preferably from 50 to 300 nm, particularly preferably from 50 to 250 nm, are used as grafting base Al of this component A.

The graft copolymer A is in general a one-stage or multistage copolymer, ie. a polymer composed of a core and one or more shells. The polymer consists of a base stage (graft core) A1 and one or, preferably, more stages A2 (graft layer) grafted thereon, ie. graft stages or graft shells.

By a single grafting or multiple stepwise grafting, it is possible to apply one or more graft shells to the rubber particles, and each graft shell may have a different composition. In addition to the grafting monomers, polyfunctional crosslinking monomers or monomers which contain reactive groups may also be grafted on (cf. for example EP-A 230 282, German Laid-Open Application DOS 3,601,419, EP-A 269 861).

In a preferred embodiment, component A consists of a multistage graft copolymer, the graft stages generally being prepared from resin-forming monomers and having a glass transition temperature $T_g$ above 30° C., preferably above 50° C. The multistage structure serves, inter alia, to achieve (partial) compatibility of the rubber particles A with the thermoplastic B.

Graft copolymers A are prepared, for example, by grafting at least one of the monomers A2 mentioned below onto at least one of the grafting bases or graft core materials A1 mentioned above. Suitable grafting bases A1 of the novel molding materials are all the polymers which are described above under the emulsion polymers A.

According to one embodiment, component A is a graft copolymer having a glass transition temperature below 0° C. and a mean particle size of from 50 to 1000 nm, composed of a particulate grafting base A1 which has a glass transition temperature below 0° C. and contains from 1 to 20% by weight of at least one crosslinking agent as defined above and a graft layer A2 comprising vinylaromatic and/or ethylenically unsaturated monomers.

Component A is preferably a graft copolymer of a1: from 1 to 99, preferably from 55 to 80, in particular from 55 to 65, % by weight of a particulate grafting base A1 comprising as monomers, based on A1, a11: from 50 to 99% by weight of a $C_1$–$C_8$-alkyl ester of acrylic acid, preferably n-butyl acrylate and/or ethylhexyl acrylate, as component A11, a12: from 1 to 20% by weight of at least one crosslinking agent as defined in claim 1 or 2 as component A12, a13: from 0 to 49% by weight of components A21 and/or A22 and/or maleic anhydride as component A13, and a14: from 0 to 10% by weight of at least one further polyfunctional crosslinking monomer as component A14, the sum of the amounts of components A11, A12 and, if required, A13 and/or A14 being 100% by weight, a2: from 1 to 99, preferably from 20 to 45, in particular from 35 to 45, % by weight of a graft layer A2 comprising as monomers, based on A2, a21: from 40 to 100, preferably from 65 to 85, % by weight of units of a vinylaromatic monomer, preferably of styrene, of a substituted styrene or of a (meth) acrylate or of a mixture thereof, in particular of styrene and/or of α-methylstyrene, as component A21, and a22: up to 60, preferably from 15 to 35, % by weight of units of an ethylenically unsaturated monomer, preferably of acrylonitrile or of methacrylonitrile, in particular of acrylonitrile, as component A22, the graft layer A2 comprising at least one graft shell.
Preferably, no component A14 is used.
Preferably from 75 to 99, particularly preferably from 90 to 99, % by weight of component A11 and preferably from 1 to 20, particularly preferably from 1 to 5, % by weight of component A12 are used.

Component A11 is in particular n-butyl acrylate.

Suitable monomers for the formation of the graft layer A2 may be selected, for example, from the monomers listed below and mixtures thereof:

vinylaromatic monomers A21, such as styrene and its substituted derivatives, eg. α-methylstyrene, p-methylstyrene, 3,4-dimethylstyrene, p-tert-butylstyrene, o- and p- divinylbenzene and p-methyl-α-methylstyrene, or $C_1$–$C_8$-alkyl (meth)acrylates, such as methyl methacrylate, ethyl methacrylate, methyl acrylate, ethyl acrylate, n-butyl acrylate and sec-butyl acrylate, preferably styrene, α-methylstyrene and methyl methacrylate, in particular styrene and/or α-methylstyrene, and ethylenically unsaturated monomers A22, such as acrylic and methacrylic compounds, eg. acrylonitrile, methacrylonitrile, acrylic and methacrylic acid, methyl acrylate, ethyl acrylate, n-propyl and isopropyl acrylate, n-butyl and isobutyl acrylate, tert-butyl acrylate, 2-ethylhexyl acrylate, methyl methacrylate, ethyl methacrylate, n-propyl and isopropyl methacrylate, n-butyl and isobutyl methacrylate, tert-butyl methacrylate, cyclohexyl methacrylate and isobornyl methacrylate, maleic anhydride and its derivatives, such as maleic esters, maleic diesters and maleimides, for example alkyl- and arylmaleimides, such as methyl- or phenylmaleimide. Acrylonitrile and methacrylonitrile are preferred, in particular acrylonitrile.

Furthermore, styrene, vinyl, acrylic or methacrylic compounds (eg. styrene, unsubstituted or substituted by $C_1$–$C_{12}$-alkyl, halogen or halomethylene; vinylnaphthalene, vinylcarbazole; vinyl ethers having $C_1$–$C_{12}$-ether radicals; vinylimidazole, 3-(4-)vinylpyridine, dimethylaminoethyl (meth)acrylate, p-dimethylaminostyrene, acrylonitrile, methacrylonitrile, acrylic acid, methacrylic acid, butyl acrylate, ethylhexyl acrylate and methyl methacrylate and fumaric acid, maleic acid, itaconic acid or their anhydrides, amides, nitriles or esters with alcohols of 1 to 22, preferably 1 to 10, carbon atoms) may be used as (co)monomers.

According to one embodiment of the invention, component A comprises from 50 to 90% by weight of the grafting base Al described above and from 10 to 50% by weight of the graft layer A2 described above, based on the total weight of component A.

According to one embodiment of the invention, crosslinked acrylate polymers having a glass transition temperature below 0° C. serve as grafting base A1. The crosslinked acrylate polymers should preferably have a glass transition temperature below –20° C., in particular below –30° C.

In a preferred embodiment, the graft layer A2 consists of at least one graft shell and the outermost graft shell thereof has a glass transition temperature of more than 30° C., where a polymer formed from the monomers of the graft layer A2 would have a glass transition temperature of more than 80° C.

With regard to the measurement of the glass transition temperature and the mean particle size and the Q values, the statements made in connection with the emulsion polymers A are applicable to the graft copolymers A.

The graft copolymers A may also be prepared by grafting preformed polymers onto suitable graft homopolymers. Examples of these are the reaction products of copolymers containing maleic anhydride or acid groups with base-containing rubbers.

Suitable preparation processes for graft copolymers A are emulsion, solution, mass or suspension polymerization. The graft copolymers A are preferably prepared by free radical emulsion polymerization, in particular in the presence of latices of component A1 at from 20 to 90° C. using water-soluble or oil-soluble initiators, such as peroxodisulfate or benzyl peroxide, or with the aid of redox initiators. Redox initiators are also suitable for the polymerization below 20° C.

Suitable emulsion polymerization methods are described in German Laid-Open Applications DOS 2,826,925 and DOS 3,149,358 and in German Patent 1,260,135.

The graft shells are preferably synthesized by the emulsion polymerization method, as described in German Laid-Open Applications DOS 3,227,555, DOS 3,149,357, DOS 3,149,358 and DOS 3,414,118. The establishment of the novel particle sizes in the defined range from 50 to 1000 nm is preferably carried out by the methods described in German Patent 1,260,135 and German Laid-Open Application DOS 2,826,925 or Applied Polymer Science 9 (1965), 2929. The use of polymers having different particle sizes is disclosed, for example, in German Laid-Open Application DOS 2,826,925 and U.S. Pat. No. 5,196,480.

According to the process described in German Patent 1,260,135, the grafting base A1 is first prepared by polymerizing the acrylate or acrylates used according to one embodiment of the invention and the polyfunctional, crosslinking monomers, if required together with the further comonomers, in aqueous emulsion in a manner known per se at from 20 to 100° C., preferably from 50 to 80° C. The conventional emulsifiers, for example alkali metal salts of alkanesulfonic or alkylarylsulfonic acids, alkylsulfates, fatty alcohol sulfonates, salts of higher fatty acids of 10 to 30 carbon atoms or resin soaps, may be used. The sodium salts of alkanesulfonates or fatty acids of 10 to 18 carbon atoms are preferably used. According to one embodiment, the emulsifiers are used in amounts of from 0.5 to 5, in particular from 1 to 2, % by weight, based on the monomers used in the preparation of the grafting base A1. In general, a weight ratio of water to monomers of from 2:1 to 0.7:1 is used. The polymerization initiators used are in particular the conventional persulfates, for example potassium persulfate. However, redox systems may also be used. The initiators are used in general in amounts of from 0.1 to 1% by weight, based on the monomers used in the preparation of the grafting base A1. The conventional buffer substances by means of which a pH of, preferably, from 6 to 9 is established, such as sodium bicarbonate and sodium pyrophosphate, and from 0 to 3% by weight of a molecular weight regulator, such as a mercaptan, a terpinol or dimeric α-methylstyrene, may be used as further polymerization assistants in the polymerization.

The exact polymerization conditions, in particular the type, metering and amount of the emulsifier, are determined specifically within the abovementioned ranges so that the resulting latex of the crosslinked acrylate polymer has a $d_{50}$ value of about 50–1 000 nm, preferably 50–150 nm, particularly preferably 80–100 nm. The particle size distribution of the latex should preferably be narrow. The quotient Q should be <0.5, preferably <0.35.

According to one embodiment of the invention, a monomer mixture of styrene and acrylonitrile is then polymerized in a subsequent step in the presence of the resulting latex of the crosslinked acrylate polymer for the preparation of the graft polymer A, the weight ratio of styrene to acrylonitrile in the monomer mixture being from 100:0 to 40:60, preferably from 65:35 to 85:15, according to one embodiment of the invention. It is advantageous to carry out this graft copolymerization of styrene and acrylonitrile onto the crosslinked polyacrylate polymer serving as a grafting base once again in aqueous emulsion under the conventional conditions described above. The graft copolymerization can advantageously be carried out in the same system as the emulsion polymerization for the preparation of the grafting base A1, and, if necessary, further emulsifier and initiator may be added. The styrene/acrylonitrile monomer mixture to be grafted on according to one embodiment of the invention may be added to the reaction mixture all at once, batchwise in a plurality of stages or, preferably, continuously during the polymerization. The graft copolymerization of the mixture of styrene and acrylonitrile in the presence of the crosslinking acrylate polymer is carried out so that a degree of grafting of from 1 to 99, preferably from 20 to 45, in particular from 35 to 45, % by weight, based on the total weight of component A, results in the graft copolymer A. Since the grafting yield in the graft copolymerization is not 100%, the amount of styrene/acrylonitrile monomer mixture used in the graft copolymerization must be slightly larger than that corresponding to the desired degree of grafting. The control of the grafting yield in the graft copolymerization and hence of the degree of grafting of the prepared graft comonomer A is familiar to a person skilled in the art and can be effected for example, inter alia, by means of the metering rate of the monomers or by addition of regulators (Chauvel, Daniel, ACS Polymer Preprints 15 (1974), 329 et seq.). The emulsion graft copolymerization generally gives from about 5 to 15% by weight, based on the graft copolymer, of free, ungrafted styrene/acrylonitrile copolymer. The amount of graft copolymer A in the polymerization product obtained in the graft copolymerization is determined by the abovementioned method.

In the preparation of the graft copolymers A by the emulsion method, reproducible changes in particle size are also possible, for example by at least partial agglomeration of the particles to give larger particles, in addition to the existing process engineering advantages. This means that polymers having different particle sizes can also be present in the graft copolymers A.

Especially component A comprising grafting base and graft shell(s) can be optimally adapted to the respective intended use, in particular with regard to the particle size.

The graft copolymers A contain in general from 1 to 99, preferably from 55 to 80, particularly preferably from 55 to 65, % by weight of grafting base A1 and from 1 to 99, preferably from 20 to 45, particularly preferably from 35 to 45, % by weight of graft layer A2, based in each case on the total graft copolymer.

Component B

Component B is an amorphous or semicrystalline polymer.

Component B is preferably a copolymer of b1: from 40 to 100, preferably from 60 to 70, % by weight of units of a vinylaromatic monomer, preferably of styrene, of a substituted styrene or of a (meth)acrylate or of a mixture thereof, in particular of styrene and/or of α-methylstyrene, as component B1, and b2: up to 60, preferably from 30 to 40, % by weight of units of an ethylenically unsaturated monomer, preferably of acrylonitrile or of methacrylonitrile, in particular of acrylonitrile, as component B2.

According to a preferred embodiment of the invention, the viscosity number of component B is from 50 to 90, preferably from 60 to 80.

According to one embodiment of the invention, component B is composed of from 50 to 99% by weight of vinylaromatic monomers and from 1 to 50% by weight of at least one of the further monomers selected from olefins such as ethylene, propylene, 1-butene, 1-pentene, 1-hexene, 1-heptene, 3-methyl-1-butene, 4-methyl-1-butene, 4-methyl-1-pentene and 1-octene.

Component B is preferably an amorphous polymer, as described above as graft layer A2. According to one embodiment of the invention, a copolymer of styrene and/or α-methylstyrene with acrylonitrile is used as component B. The acrylonitrile content in these copolymers of component B is from 0 to 60, preferably from 30 to 40, % by weight, based on the total weight of component B. Component B also includes the free, ungrafted styrene/acrylonitrile copolymers formed in the graft copolymerization for the preparation of component A. Depending on the conditions chosen for the graft copolymerization for the preparation of graft copolymer A, it may be possible that a sufficient amount of component B has already been formed in the graft copolymerization. In general, however, it will be necessary to mix the products obtained in the graft copolymerization with additional, separately prepared component B.

This additional, separately prepared component B may preferably be a styrene/acrylonitrile copolymer, an α-methylstyrene/acrylonitrile copolymer or an α-methylstyrene/styrene/acrylonitrile terpolymer. These copolymers may be used individually or as a mixture for component B, so that the additional, separately prepared component B of the molding materials used according to the invention may be, for example, a mixture of a styrene/acrylonitrile copolymer and an α-methylstyrene/acrylonitrile copolymer. Where component B of the molding materials used according to the invention consists of a mixture of a styrene/acrylonitrile copolymer and an α-methylstyrene/acrylonitrile copolymer, the acrylonitrile content of the two copolymers should preferably not differ from one another by more than 10, preferably more than 5, % by weight, based on the total weight of the copolymer. However, component B of the molding materials used according to the invention may also consist only of a single styrene/acrylonitrile copolymer if the same monomer mixture of styrene and acrylonitrile is used as a starting material in the graft copolymerizations for the preparation of component A and in the preparation of the additional, separately prepared component B.

The additional, separately prepared component B can be obtained by the conventional processes. Thus, according to one embodiment of the invention, the copolymerization of the styrene and/or α-methylstyrene with the acrylonitrile can be carried out by mass, solution, suspension or aqueous emulsion polymerization. Component B preferably has a viscosity number of from 40 to 100, preferably from 50 to 90, in particular from 60 to 80. The viscosity number is determined according to DIN 53 726, 0.5 g of material being dissolved in 100 ml of dimethylformamide.

In a preferred embodiment, the molding materials contain additional components C and/or D and, if required, further additives as described below, in addition to components A and B.

Component C

Suitable polycarbonates C are known per se. They preferably have a weight average molecular weight ($M_w$, determined by gel permeation chromatography in tetrahydrofuran against polystyrene standards) of from 10,000 to 60,000 g/mol. They are obtainable, for example, by interfacial polycondensation according to the process of DE-B-1 300 266 or by reacting diphenyl carbonate with bisphenols according to the process of DE-A-1 495 730. The preferred bisphenol is 2,2-di(4-hydroxyphenyl)propane, in general—and also below—referred to as bisphenol A.

Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane, 4,4'-dihydroxybiphenyl or dihydroxydiphenylcycloalkanes, preferably dihydroxydiphenylcyclohexanes or dihydroxydiphenylcyclopentanes, in particular 1,1-bis(4-hydroxyphenyl)-3,3,5-trimethylcyclohexane, and mixtures of the abovementioned dihydroxy compounds.

Particularly preferred polycarbonates are those based on bisphenol A or bisphenol A together with up to 80 mol % of the abovementioned aromatic dihydroxy compounds.

It is also possible to use copolycarbonates according to U.S. Pat. No. 3 737 409; of particular interest here are copolycarbonates based on bisphenol A and di(3,5-dimethyldihydroxyphenyl) sulfone, which are distinguished by high heat distortion resistance. It is also possible to use mixtures of different polycarbonates.

The weight average molecular weights ($M_w$, determined by gel permeation chromatography in tetrahydrofuran against polystyrene standards) of the polycarbonates C are, according to the invention, from 10,000 to 64,000 g/mol. They are preferably from 15,000 to 63,000, in particular from 15,000 to 60,000, g/mol. This means that the polycarbonates C have relative solution viscosities of from 1.1 to 1.3, preferably from 1.15 to 1.33, measured in 0.5% strength by weight solution in dichloromethane at 25° C. The relative solution viscosities of the polycarbonates used preferably do not differ by more than 0.05, in particular more than 0.04.

The polycarbonates C may be used both as milled material and in granulated form. They are present as component C in amounts of from 0 to 50, preferably from 10 to 40, % by weight, based in each case on the total molding material.

According to one embodiment of the invention, the addition of polycarbonates leads, inter alia, to higher heat stability and improved crack resistance of the molding materials.

Component D

The preferred novel thermoplastic molding materials contain, as component D, from 0 to 50, preferably from 0 to 40, in particular from 0 to 30, % by weight of fibrous or particulate fillers or mixtures thereof, based in each case on the total molding material. These are preferably commercially available products. Reinforcing agents, such as carbon fibers and glass fibers, are usually used in amounts of from 5 to 50% by weight, based on the total molding material.

The glass fibers used may comprise E, A or C glass and are preferably provided with a size and an adhesion promoter. Their diameter is in general from 6 to 20 μm. Both rovings and staple glass fibers having a length of from 1 to 10 μm, preferably from 3 to 6 μm, may be used.

Fillers or reinforcing materials, such as glass beads, mineral fibers, whiskers, alumina fibers, mica, quartz powder and wollastonite, may also be added.

Moreover, metal flakes (eg. aluminum flakes from Transmet Corp.), metal powders, metal fibers, metal-coated fillers, for example nickel-coated glass fibers, and other additives which provide shielding against electromagnetic waves may be mixed with the novel molding materials. In particular, aluminum flakes (K 102 from Transmet) are suitable for EMI (electro-magnetic interference) purposes. The materials may furthermore be mixed with additional carbon fibers, carbon black, in particular conductive carbon black, or nickel-coated carbon fibers.

The novel molding materials may also contain further additives which are typical for, and conventionally used in, polycarbonates, SAN polymers and graft copolymers or mixtures thereof. Examples of such additives are dyes, pigments, colorants, antistatic agents, antioxidants and stabilizers for improving the heat stability, for increasing the light stability and for increasing the stability to hydrolysis and the resistance to chemicals, agents to prevent thermal decomposition and in particular the lubricants which are advantageous for the production of moldings or shaped articles. These further additives can be metered in at any stage of the preparation process but are preferably introduced at an early stage to take advantage of the stabilizing effects (or other special effects) of the additive early on. Heat stabilizers or antioxidants are usually metal halides (chlorides, bromides, iodides) which are derived from metals of group I of the Periodic Table of Elements (such as Li, Na, K and Cu).

Suitable stabilizers are the conventional hindered phenols, as well as vitamin E or compounds having a similar structure. HALS (Hindered Amine Light Stabilizers), benzophenones, resorcinols, salicylates, benzotriazoles and other compounds are also suitable (for example Irganox®, Tinuvin®, such as Tinuvin® 770 (HALS absorber, bis(2,2,6,6-tetramethyl-4-piperidyl) sebacate) or Tinuvin®P (UV absorber-(2H-benzotriazol-2-yl)-4-methylphenol), Topanol®). These are usually used in amounts of up to 2% by weight (based on the total mixture).

Suitable lubricants and mold release agents are stearic acids, stearyl alcohol, stearic esters and generally higher fatty acids, their derivatives and corresponding fatty acid mixtures of 12 to 30 carbon atoms. The amounts of these additives are from 0.05 to 1% by weight.

Silicone oils, oligomeric isobutylene or similar substances are also suitable additives, and the conventional amounts are from 0.05 to 5% by weight. Pigments, dyes and tints, such as ultramarine blue, phthalocyanines, titanium dioxide, cadmium sulfides and derivatives of perylene tetracarboxylic acid, may also be used.

Processing assistants and stabilizers, such as UV stabilizers, lubricants and antistatic agents are usually used in amounts of from 0.01 to 5% by weight, based on the total molding material.

The preparation of the novel thermoplastic molding materials can be carried out by methods known per se, by mixing the components. It may be advantageous to premix individual components. It is also possible to mix the components in solution and remove the solvents.

If components A and B have been prepared, for example, by emulsion polymerization, it is possible to mix the resulting polymer dispersions with one another, then to coprecipitate the polymers and to work up the polymer mixture. The graft copolymerization products (component A) obtained in aqueous dispersion may also be only partially dewatered and mixed as moist crumbs with component B, in which case complete drying of the graft copolymers is effected during mixing.

Suitable organic solvents are, for example, chlorobenzene, mixtures of chlorobenzene and methylene chloride or mixtures of chlorobenzene and aromatic hydrocarbons, eg. toluene.

The solvent mixtures can be evaporated, for example, in devolatilization extruders.

Mixing of the components, for example dry components, can be carried out by all known methods. However, mixing of the components A, B and, if required, C and D is preferably carried out by extruding, kneading or roll-milling the components together, preferably at from 180 to 400° C., if necessary the components having been isolated beforehand from the solution obtained in the polymerization or from the aqueous dispersion.

The components may be metered in together or separately/in succession.

According to one embodiment of the invention, moldings can be produced from the molding materials according to the invention by the known methods for processing thermoplastics. In particular, the production can be carried out by thermoforming, extrusion, injection molding, calendering, blow molding, compression molding, pressure sintering or sintering.

The present invention furthermore relates to moldings comprising the novel molding materials. The impact strength of the molding materials or moldings is improved by using the novel crosslinking agents.

In particular, moldings comprising molding materials which contain polycarbonates as component C have very high heat distortion resistance and are resistant to persistent heat. By adding the polycarbonate as component C, the heat distortion resistance and impact strength of the moldings is further improved. These moldings furthermore have a balanced ratio of toughness and rigidity and good dimensional stability as well as excellent resistance to heat-aging and high resistance to yellowing under thermal load and under the action of UV radiation.

Further advantageous properties of the moldings are the high weathering stability, good thermal stability, high resistance to yellowing when exposed to UV radiation and thermal load, good stress cracking resistance, in particular under the action of chemicals, and good antielectrostatic behavior. Moreover, they have high color stability, for example also as a result of the excellent resistance to yellowing and embrittlement. The novel moldings comprising the novel thermoplastic molding materials show no significant loss of toughness or impact strength both at low temperatures and after relatively long-lasting action of heat, said toughness or impact strength being retained even on exposure to UV radiation. The tensile strength, too, is retained. In addition, they have a balanced ratio of rigidity and toughness.

The Examples which follow illustrate the invention.

EXAMPLE 1

Preparation of Graft Copolymer (A)

(a1) 160 g of a monomer mixture comprising 79 parts of butyl acrylate, one part of maleic anhydride and two parts of polymethyl methacrylate having a number average molecular weight of 320,000, transesterified with allyl alcohol and having a degree of transesterification of 12% by weight, based on the polymethyl methacrylate used, in 1500 g of water, were heated to 60° C. with the addition of 5 g of the sodium salt of a $C_{12}$–$C_{18}$-paraffinsulfonic acid, 3 g of potassium persulfate, 3 g of sodium bicarbonate and 1.5 g of sodium pyrophosphate while stirring. 10 minutes after the initiation of the polymerization reaction, a further 48 g of the monomer mixture were added in the course of 3 hours. After the end of the monomer addition, the reaction was allowed to continue for a further hour at 60° C.

(a2) 2100 g of the emulsion prepared in (a1) were mixed with 1150 g of water and 2.7 g of potassium persulfate and heated to 65° C. while stirring. 500 g of a monomer mixture consisting of 73 parts by weight of styrene, 25 parts by weight of acrylonitrile and 2 parts by weight of dimethylaminoethyl acrylate were then metered in over 3 hours. After the end of the addition, the emulsion was kept at 65° C. for a further two hours. The graft polymer obtained was then precipitated from the emulsion in a 15% strength aqueous $CaCl_2$ solution, washed with water and dried in an air stream at from 40 to 65° C. The degree of grafting of the graft copolymer was 39% and the particle size was 100 nm.

EXAMPLE 2
Preparation of Graft Copolymer (a)

(a1) 160 g of n-butyl acrylate and 26 g of the crosslinking agent from Example 1, in 1500 g of water, were heated to 60° C. with the addition of 1 g of the sodium salt of a $C_{12}$–$C_{18}$-paraffinsulfonic acid, 3 g of potassium persulfate, 3 g of sodium bicarbonate and 1.5 g of sodium pyrophosphate while stirring. Ten minutes after the initiation of the polymerization reaction, a mixture of 800 g of n-butyl acrylate and 20 g of the crosslinking agent was added in the course of three hours. After the end of the monomer addition, the reaction was allowed to continue for a further hour. The resulting emulsion of the acrylate polymer had a solids content of about 40% by weight.

(a2) 1500 g of the emulsion from (a1) were mixed with 400 g of a mixture of styrene and acrylonitrile (weight ratio 75:25) and 600 g of water and, after the addition of a further 0.5 g of potassium persulfate and 0.5 g of lauroyl peroxide, were heated at 65° C. for four hours while stirring. After the end of the graft copolymerization, the polymer was precipitated with a $CaCl_2$ solution at 95° C., washed with water and dried in a warm air stream. The degree of grafting was 35% and the particle size was 90 nm.

EXAMPLE 3

The process according to Example 1 was carried out, except that the crosslinking agent used was butadienylpolyethylene which consisted of a polyethylene skeleton which had a number average molecular weight of 550,000 and a degree of branching of 50/1000 C. and had been grafted with 55% by weight, based on the polyethylene used, of butadiene.

EXAMPLE 4

The process according to Example 2 was carried out, except that the crosslinking agent from Example 3 was used.

EXAMPLE 5

The process according to Example 1 was carried out, except that the crosslinking agent used was a polyvinyl alcohol which had a number average molecular weight of 550,000 and was etherified with 8% by weight, based on the amount of the polyvinyl alcohol used, of allyl chloride.

EXAMPLE 6

The process according to Example 2 was carried out, except that the crosslinking agent from Example 5 was used.

EXAMPLE 7

The process according to Example 1 was carried out, except that the crosslinking agent used was a polyvinyl alcohol which had a number average molecular weight of 100,000 and had been reacted with 15% by weight, based on the initial amount of polyvinyl alcohol, of methacrylic anhydride.

EXAMPLE 8

The process according to Example 2 was carried out, except that a crosslinking agent according to Example 7 was used.

EXAMPLE 9
Preparation of Copolymer (B)

A monomer mixture comprising styrene and acrylonitrile was polymerized in solution under the usual conditions. The styrene/acrylonitrile copolymer obtained had an acrylonitrile content of 35% by weight, based on the copolymer, and a viscosity number of 80 ml/g.

EXAMPLE 10
(COMPARATIVE EXAMPLE)

The process according to Example 1 was repeated, except that, instead of the crosslinking agent, a corresponding amount of n-butyl acrylate was used.

PREPARATION OF THE MOLDING MATERIALS

Molding materials were prepared from 40% by weight of the polymers (A) according to Examples 1 to 8 and 10 and 60% by weight of the polymer from Example 9 in an extruder at from 200 to 230° C. The molding materials were injection molded under the injection conditions stated in DIN 1677 to give test specimens. The test specimens were standard small bars for measuring the notched impact strength.

The notched impact strength of the test specimens, in $kJ/m^2$, was measured according to DIN 53354. The results for the notched impact strength at 23° C. are shown in Table 1, and those for 0° C. in Table 2. The values shown in brackets relate to the comparative molding material which contained comparative component A from Example 10.

TABLE 1

Notched impact strength in $kJ/m^2$ at 23° C.

| Component A from | Injection temperature | | |
|---|---|---|---|
| Example | 220° C. | 260° C. | 280° C. |
| 1 | — | 36 (26) | 36 (26) |
| 2 | 38 (26) | — | — |
| 3 | — | 36 (26) | 36 (26) |
| 4 | 38 (26) | — | — |
| 5 | — | 34 (26) | 32 (26) |
| 6 | 32 (26) | — | — |
| 7 | — | 36 (26) | 36 (26) |
| 8 | 34 (26) | — | — |

TABLE 2

Notched impact strength in $kJ/m^2$ at 0° C.

| Component A from | Injection temperature | | |
|---|---|---|---|
| Example | 220° C. | 260° C. | 280° C. |
| 1 | — | 36 (14) | 36 (14) |
| 2 | 29 (14) | — | — |
| 3 | — | 29 (14) | 30 (14) |
| 4 | 29 (14) | — | — |
| 5 | — | 22 (14) | 24 (14) |
| 6 | 24 (14) | — | — |

TABLE 2-continued

| Component A from Example | Notched impact strength in kJ/m² at 0° C. Injection temperature | | |
|---|---|---|---|
| | 220° C. | 260° C. | 280° C. |
| 7 | — | 28 (14) | 26 (14) |
| 8 | 28 (14) | — | — |

The values shown in the Tables reveal that the novel molding materials have a substantially better notched impact strength than the known molding materials.

What is claimed is:

1. A method of forming a cross-linked particulate emulsion polymer having a glass transition temperature below 0° C. and a mean particle size (weight average) of from 50 to 1000 nm which comprises polymerizing the monomers producing the emulsion polymer in the presence of a crosslinking agent of the formula (I):

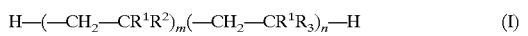

where $R^1$ is H or methyl, $R^2$ is —C(O)—Y—$R^4$, where $R^4$ is H, methyl, ethyl or allyl, $R^3$ is —C(O)—Y-ally and Y is O or NH or $R^1$ is H or $C_1$–$C_{20}$-alkyl, $R^2$ is H and $R^3$ is (—$CH_2$—$CR^5$=$CR^6$—$CH_2$)$_p$—H, where $R^5$ and $R^6$ independently are each H, methyl, ethyl or chlorine and p is 1–100, or $R^1$ is H, $R^2$ is OH or O-allyl and $R^3$ is O-allyl, or $R^1$ is H, $R^2$ is OH or $R^3$ and $R^3$ is (meth)acrylate, —O—C(O)—CH=CH—COOH or —O—C(O)—$CH_2$—C(=$CH_2$)—COOH, and m is an integer from 5 to 500,000 and n is an integer from 2 to 100,000, and the ratio n:m being from 1:50 to 10:1.

2. A particulate cross-linked emulsion polymer which is the product of the process of claim 1.

3. A thermoplastic molding material containing, based on the sum of the amounts of components A and B and, optionally, C and/or D, which altogether gives 100% by weight, a: from 1 to 99% by weight of the particulate crosslinked emulsion polymer of claim 2 as component A, b: from 1 to 99% by weight of at least one amorphous or semicrystalline polymer as component B, c: from 0 to 50% by weight of polycarbonates as component C, and d: from 0 to 50% by weight of fibrous or particulate fillers or mixtures thereof as component D.

4. A molding material as claimed in claim 3, wherein component A is a graft copolymer of a1: from 1 to 99% by weight of a particulate grafting base A1 comprising as monomers, based on A1, a11: from 50 to 99% by weight of a $C_1$–$C_8$-alkyl ester of acrylic acid as component A11, a12: from 1 to 20% by weight of said at least one crosslinking agent as component A12, a13: from 0 to 49% by weight of components A21 or A22 or maleic anhydride as component A13, and a14: from 0 to 10% by weight of at least one further polyfunctional crosslinking monomer as component A14, the sum of the amounts of components A11, A12 and, optionally, A13 and/or A14 being 100% by weight, a2: from 1 to 99% by weight of a graft layer A2 comprising as monomers, based on A2, a21: from 40 to 100% by weight of units of a vinylaromatic monomer as component A 21, and a22: up to 60% by weight of units of an ethylenically unsaturated monomer as component A22, the graft layer A2 comprising at least one graft shell.

5. A molding material as claimed in claim 3, wherein component B is a copolymer of b1: 40 to 100% by weight of units of a vinylaromatic monomer as component B1, and b2: up to 60% by weight of units of an ethylenically unsaturated monomer as component B2.

6. A process for the preparation of a molding material as defined in claim 3, wherein components A, B and, optionally, C and/or D are mixed by extruding, kneading or roll-milling them together at from 180 to 400° C.

7. A method of producing a molding which comprises molding a molding material as defined in claim 3, to produce a molding.

8. A molding formed from a molding material as defined in claim 3.

9. A process for the production of a molding which comprises thermoforming, extruding, injection molding, calendering, blow molding, compression molding, pressure sintering or sintering a molding material as defined in claim 3.

10. The particulate crosslinked emulsion polymer of claim 2 which is composed of a grafting base A1 which comprises polymerized ethylenically unsaturated monomers and from 1 to 20% by weight of said at least one crosslinking agent and a graft layer A2 comprising vinylaromatic or ethylenically unsaturated monomers.

11. The particulate cross-linked emulsion polymer of claim 2 which contains from 0.5 to 30% by weight of said cross-linking agent.

* * * * *